Sept. 18, 1945.  R. LANG ET AL  2,384,841
HYDRAULIC TORQUE CONVERTER
Filed June 18, 1941  5 Sheets-Sheet 1

Inventors:
Richard Lang
Jürgen von Fahland
Hermann Gros
By Edmund H. Parry Jr.
Attorney Sept. 18, 1945.  R. LANG ET AL  2,384,841
HYDRAULIC TORQUE CONVERTER
Filed June 18, 1941    5 Sheets-Sheet 2

Inventors:
Richard Lang
Jürgen von Fahland
Hermann Gros

By Edmund H. Parry
Attorney

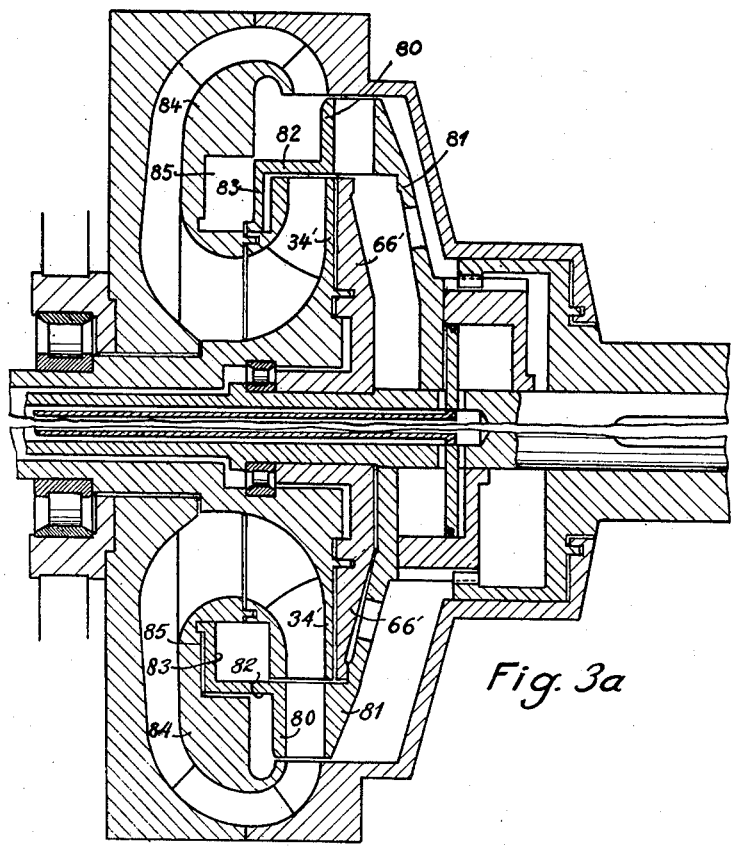

Inventors:
Richard Lang
Jürgen von Fahland
Hermann Gros

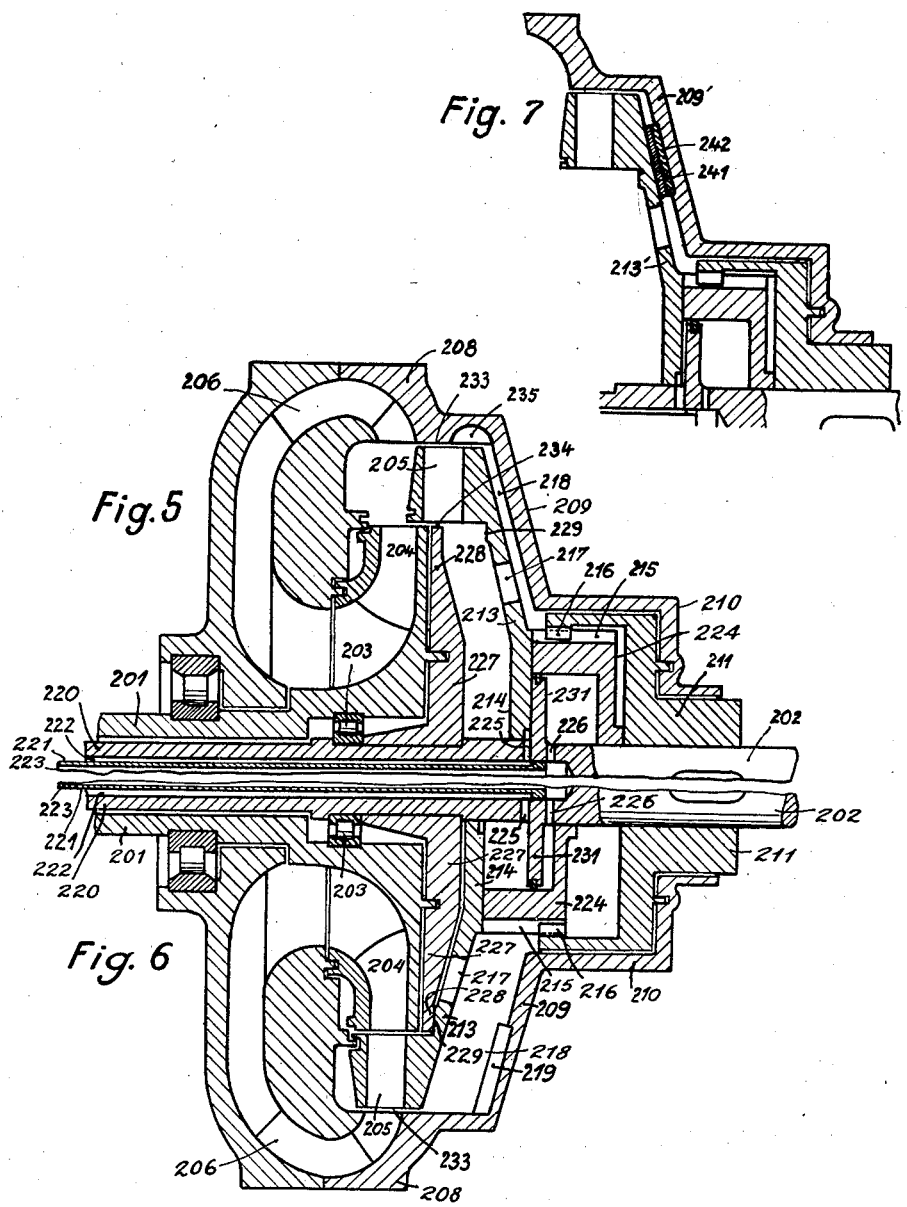

Patented Sept. 18, 1945

2,384,841

UNITED STATES PATENT OFFICE 2,384,841

HYDRAULIC TORQUE CONVERTER

Richard Lang, Ravensburg, and Jürgen von Fahland and Hermann Gros, Friedrichshafen, Bodensee, Germany; vested in the Alien Property Custodian Application June 18, 1941, Serial No. 398,686
In Germany June 18, 1940

3 Claims. (Cl. 60—54)

Our invention relates to hydraulic torque converters and has special reference to converters of this kind as they are used in connection with internal combustion engines because of their favourable adaptability to the turning moment over a certain portion of the transmissions. They are also made use of in connection with mechanical change speed gears when it is necessary for the transmission to cover a large area of secondary numbers of revolutions, as for example in the driving mechanism of rail cars.

A main disadvantage with hydraulic torque converters in such mechanisms is the circumstance that the disengagement and re-engagement of the transmission can only be perfected slowly or by means of additional devices and with shocks. As the emptying and filling in spite of all expediting steps (increase of the emptying cross section and of the filling pumps) lasts at least several seconds and as an interruption in transmission for such a long period is not admissible, it became necessary to provide special friction clutches in addition to the hydraulic power transmission permitting these to remain filled while the friction clutches are disengaged. The dimension and the weight of such clutches are extraordinary in connection with high performances, their mounting is difficult and they require large operating devices.

The greatest disadvantage of such friction clutches connected to hydraulic transmissions is that the centrifugal forces of the rotating parts of the friction clutch and of the hydraulic transmission make the engagement of the clutch difficult. They cause great shocks when starting (engagement of the clutch) and when changing speed, such shocks being not only disagreeable in vehicles but causing great wear, especially if the vehicle with great performance has to be driven at low speed, for example when towing or shifting other cars. If, for instance, a rail car which has a transmission with a friction clutch situated behind a hydraulic torque converter starts a heavy shock will occur when the clutch half in connection with the rotating secondary part of the converter engages the driving device for the wheels which are still at rest. Similar difficulties will occur in connection with transmissions having a plurality of hydraulic torque converters or having a gear transmission in addition when changing from one speed to another.

These disadvantages are avoided by our invention which provides for a very short interruption and an immediate re-engagement of the transmission without shocks.

For this purpose, according to our invention, means are provided for shifting the turbine wheel of the hydraulic converter out of the hydraulic circuit thus causing its separation from the working transmission.

By our invention we do not intend to increase the efficiency of the transmission; the turbine wheel is only shifted for the purpose of separating the secondary part out of the circuit of the hydraulic converter. As this state of separation is only short in time it does not matter that during this period the incoming primary performance, even if it be the maximum output of the motor, is transferred into whirls, shocks and friction inside of the transmission, as it is not a normal state but occurs only when the transmission is interrupted.

According to our invention, we further improve the prevailing conditions by providing means for braking the turbine wheel or reducing its speed of rotation after it has been shifted out of the hydraulic circulation. Thus the speed of rotation of a clutch half which may be situated behind the hydraulic converter and connected to a mechanical change speed gear is also reduced so that within a short time that speed of rotation is reached which allows for final clutch engagement. Consequently, the time period necessary for a speed change is considerably reduced. Besides, it is not necessary to provide additional devices for quick speed reduction of the driven parts behind the torque converter, while would require additional space.

It is preferred, according to our invention, to shift the turbine wheel so far towards the wall of the casing that there is only a small intermediate space so that the friction and whirling of the liquid in rotation with the wheel causes its braking; or blades may be provided on the casing wall causing speed reduction of the circulating fluid and consequently also of the wheel itself.

Usually there are holes in the disc of the turbine wheel for the purpose of equalizing the fluid pressure, so that the fluid escaping through the narrow space at the circumference of the turbine wheel is again fed to this wheel, thus causing a pumping effect which results in braking of the wheel. For the purpose of increasing this effect there may be provided channels or gaps in the wall of the housing where it surrounds the turbine wheel when withdrawn, for leading the liquid over to the other side of the wheel disc.

Another advantageous construction, according to our invention, is the provision of friction surfaces on one side of the turbine wheel and on the corresponding inner side of the housing wall.

The current in the hydraulic converter itself continues in the same manner after the turbine wheel is shifted out, the output being received by the hydraulic circuit as before. After shifting in the turbine wheel again, the output is immediately transmitted again by the hydraulic converter. When putting in the turbine wheel there can be no shocks whatsoever owing to differences in the speed of rotation, these being entirely suppressed by the hydraulic effects of the circuit.

The invention may be applied to power transmissions of the purely hydraulic kind as well as to transmissions with hydraulic circuits and change speed gears or to such transmissions in which hydraulic circuits are bridged over by direct coupling.

According to our invention, the blade-rim of the turbine wheel is connected with a driven shaft by a suitable support through the ports of which the pressure in the spaces before and behind this part is equalized so that there are not opposed in these spaces any essential counter-pressures to the shifting of the turbine wheel. It is useful to connect the turbine wheel with a pressure-operated cylinder or piston by means of which the turbine wheel may be shifted out of the hydraulic circuit or pushed into it, this latter being its position in the normal operation.

According to our invention, there is arranged, furthermore, on the shaft of the turbine wheel a disc or similar part which seals the shifting space, that is the space into which the turbine wheel is shifted, from the circuit spaces of high pressure. By this arrangement it is provided that particularly the highest pump pressure cannot counter-act the shifting operation of the turbine wheel. It is advantageous for the turbine wheel to be arranged and designed in such a way as to be forced, preferably by pressure-means, against side-faces of the above-mentioned disc.

When shifting the turbine wheel by pressure-means the operating member connected with the turbine wheel will be designed (in the further development of the invention) as a stepped piston, the surface acting in the direction of engaging being considerably larger than the surface acting in the direction of disengaging, the former having, for instance, double the size of the latter. If there is, therefore, no pressure supplied to the space acting in the direction of disengagement the turbine wheel is kept engaged by itself at any speed of rotation, because the centrifugal force which exists in the liquid contained in the space of engaging, creates constantly a pressure in the direction of engaging the turbine wheel.

In a further development of the invention, the turbine wheel is connected at its smallest rim diameter with a ring by which the pump wheel is locked up outwards in the disengaged position of the turbine wheel. This arrangement offers advantages in certain cases because it provides that there are fewer whirls in the hydraulic circuit when the turbine wheel is disengaged.

Having given a general description of our invention we now want to point it out more in detail having reference to the drawings which represent several examples embodying our invention.

In the drawings:

Fig. 1 is a diagrammatic, longitudinal section of a hydraulic torque converter embodying the invention, the turbine wheel being shown in the hydraulic circuit in full lines, and out of the circuit in broken lines.

Fig. 2 and Fig. 2—a are views similar to Fig. 1, showing another form of the device, Fig. 2 showing the wheel out of the circuit, and Fig. 2—a showing the wheel in the circuit.

Fig. 3 and Fig. 3—a are view similar to Figs. 2 and 2—a, respectively, showing another form of the device.

Fig. 4 and Fig. 4—a are views similar to Figs. 2 and 2—a, respectively, showing another form of the device.

Fig. 5 is a view similar to Fig. 2, showing another form of the device.

Fig. 6 is a view similar to Fig. 2—a, showing another form of the device.

Fig. 7 is a partial section of another form of the device.

Figure 1:
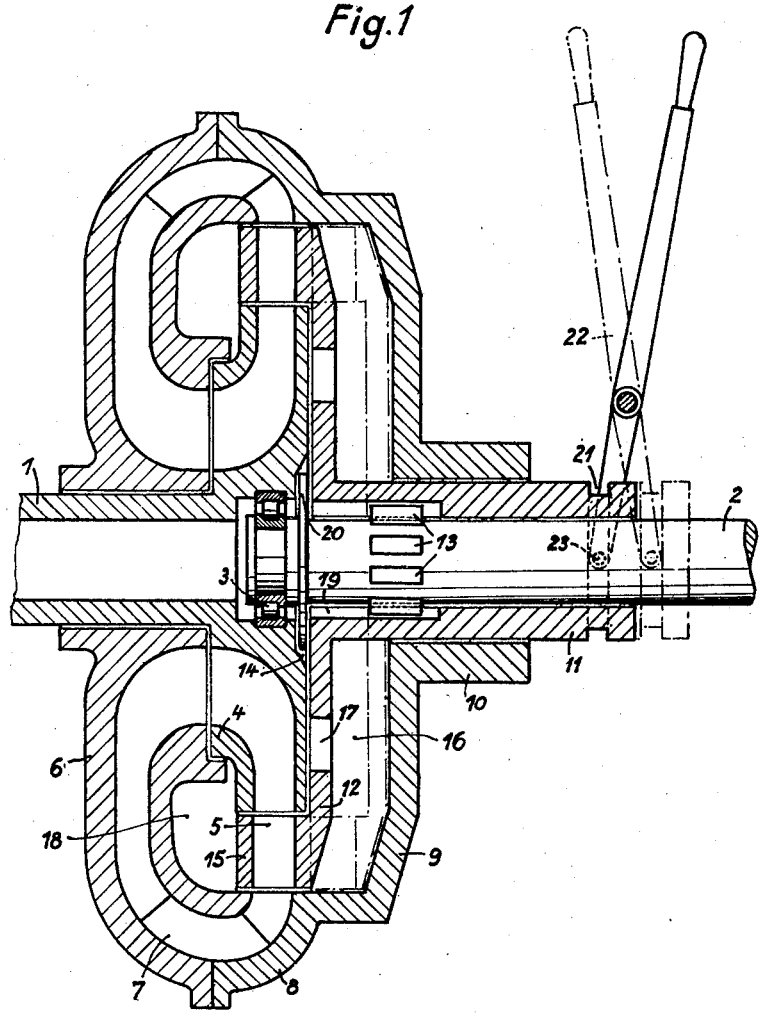

In Fig. 1 1 is the primary shaft, and 2 the secondary shaft of a hydraulic torque converter. 3 is a roller bearing carrying both the shafts. 4 is a pump wheel, 5 the turbine wheel, 6 the guide apparatus of the converter with the guide blades 7. 8 is a pipe bend, adjacent to the casing part 9, in the hub 10 of which is carried the hub 11 of the turbine wheel 5. 12 is a disc connecting the rim of the blades 15 of the turbine wheel 5 with the hub 11. This disc is provided with apertures 17. 13 are splines on the shaft 2 along which by means of keyways 19 arranged in the hub 11, the turbine wheel 5 can be shifted. 20 is a collar of the shaft 2 against which generally the hub 11 bears. 14 is the space between the pump wheel 4 and the disc 12; 16 is the space between the latter and the wall of the casing 9. 18 is a spare space in the guide apparatus. 21 is a circular keyway in the hub 11 operated in the conventional manner by a hand lever 22 by means of a fork 23.

By means of the hand lever 22 the turbine wheel 5 may be shifted from the position of normal operation as shown in Fig. 1, into the dotted line position, the turbine wheel remaining connected by means of the keys 13 and 19 with the shaft 2.

During the displacement the liquid contained in the space 16 is allowed to enter the space 14 through the apertures 17. After the turbine wheel 5 has been shifted to the broken line position the hydraulic circuit no longer transmits the torque to the turbine wheel, whereas the circuit itself is not interrupted as its liquid continues to circulate by means of the pump wheel 4 via the guide apparatus 6, 7. If the position of the fuel supply (not represented) has not been changed, the pump wheel will continue to transform, according to its characteristic, its power input into delivery and pressure. Therefore, the same energy has to be put in as before; but the number of revolutions of the pump wheel may change somewhat. The energy is absorbed by turbulence, percussion and friction (production of heat). The extension of the circuit by means of the space 18 is harmless in general; if necessary, this space can be designed as required.

Before putting into operation such a power transmission, for instance, before starting a car, the power transmission of which is provided with a hydraulic circuit according to Fig. 1, the shaft 1 and consequently the pump wheel 4 is started while the turbine wheel 5 is shifted out (dotted line position) and the fuel supply of the driving engine will be regulated according to the energy required for the start of the vehicle. The pump wheel 4 maintains the circuit according to the energy input. At first, the turbine wheel 5 is out of operation and at rest and just before the car is to start the turbine wheel is shifted into the position shown in Fig. 1 in full lines. Thus the torque is transmitted to the turbine wheel according to the size of the hydraulic torque converter, and the car starts smoothly, the number of revolutions of the shaft 2 and, consequently, the car speed increasing according to resistance.

If the hydraulic torque converter, shown in Fig. 1, is connected to a change speed gear, the turbine 5 can be "disengaged" from the circuit in the same way before changing over from one speed to another, whereupon the gear change can be effected in the conventional manner. After the gear change the turbine wheel 5 is "re-engaged" by shifting it back into the circuit. During the changing-over operation the driving energy needs no reduction. However, it is also possible to reduce it in the usual way during the changing-over period.

Figures 2, 2A:
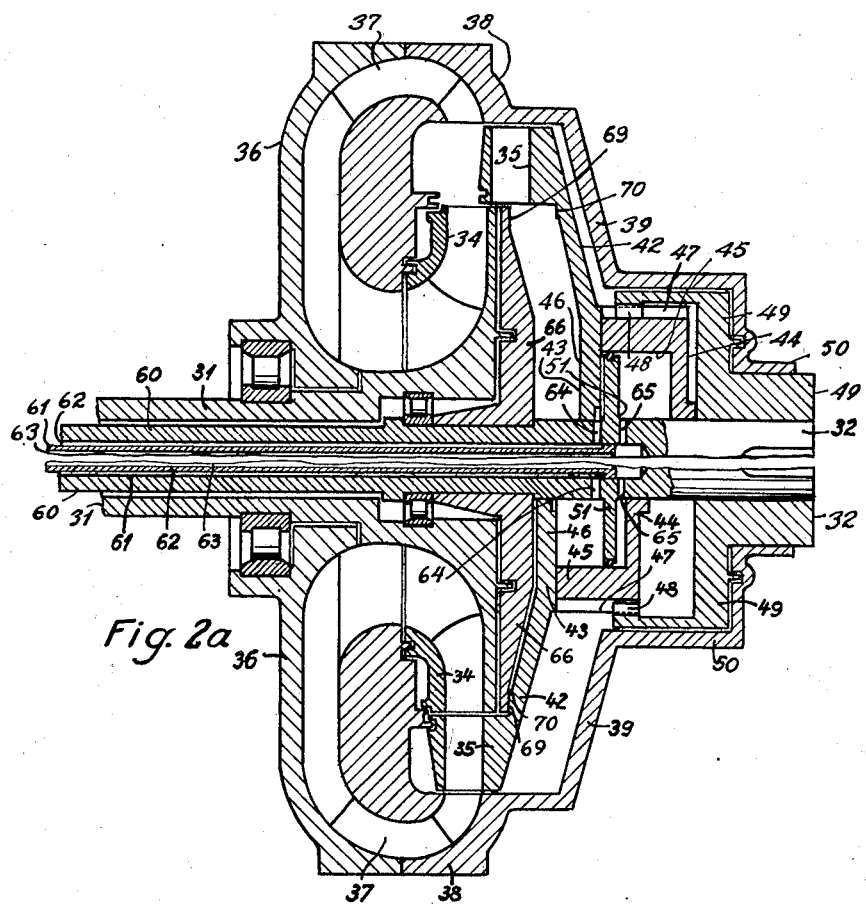

In Figs. 2 and 2—a, 31 is the primary shaft, 32 the secondary shaft of a hydraulic torque converter comprising the pump wheel 34, the turbine wheel 35 and the guide apparatus 36 with the guide blades 37 and the bend pipe 38. 39 is a casing adjacent to the bending pipe 38. The turbine wheel 35 can be displaced within the casing. The turbine wheel is connected by means of a disc 42 to a pressure-operated cylinder 43 made up of the cylinder bottom 44, the side walls 45 and the cover 46 and connected at the other hand by means of keyways 47 to keys 48 which are arranged on the driver 49 located immovably and incapable of being turned on the shaft 32. The driver, in its turn, is surrounded by the casing hub 50 adjoining casing 39.

In the bore of the shaft 31 is arranged a piece 60 of shaft 32, in the centre of which is situated a tube 61. The circular space 62 between the tube 61 and the portion of shaft 60 as well as the space 63 within the tube 61 permit the pressure supply to the cylinder 43. There are bores 64 and 65 in the portion of shaft 60 connected to the spaces 62 and 63, respectively, and lead to the centre of the cylinder 43, the bores 64 on the left hand and the bores 65 on the right hand of the disc piston 51 connected to the portion of shaft 60. Fitted on the shaft 60 is an intermediate disc-shaped piece 66 at the outer rim of which is provided a sealing surface 69. A similar sealing surface 70 is arranged on the disc 42 of the turbine wheel 35.

The turbine wheel 35 is shifted by pressure means, for instance, pressure oil, via the spaces 62 and 63 to the cylinder 43.

When the turbine wheel 35 is in the engaged position as shown in Fig. 2—a the cylinder 43 and consequently the turbine wheel 35 can be shifted to the right by admitting pressure oil through the middle space 63 of the tube 61 and the bores 65 into the space on the right hand of the piston 51 so that the turbine wheel is shifted into the disengaged position as shown in Fig. 2. On the other hand, by directing pressure oil through the circular space 62 between the tube 61 and the portion of shaft 60 and via the bores 64 to the space on the left hand of the piston 51, the turbine wheel 35 can be shifted back from its disengaged position into the circuit so that power is transmitted again to the turbine wheel in the conventional manner.

During the engaged position of the turbine wheel both the surfaces 69 and 70 are in touch and are kept in this position by means of the pressure oil fed to the space on the left hand of the solid piston 51. The interval between the pump wheel 34 and the turbine wheel 35 where exists a high pressure has no outside connection. Consequently, no high pressure can enter the space between the discs 42 and 66.

The result of the displacement of the turbine wheel 35 is the same as that in our example given in Fig. 1.

The joints conveniently provided in this arrangement are indicated in Figs. 2 and 2—a between the different parts the object of which can easily be seen from the illustration.

The example of Figs. 3 and 3—a is similar to that of Figs. 2 and 2—a. Here, too, there is provided an intermediate piece 66' fitted with a sealing surface separating the spaces of high pressure. The blade rim 80 of the turbine wheel 81 is provided with an angle ring 82, 83 situated during normal operation in the space 85 of the middle part 84 of the torque converter. When the turbine wheel is shifted outwards the pump wheel 34' is blocked at the outer periphery by the angle leg surface 82 running in the direction of the periphery of the angle rim. Thus the supply of the circuit is interrupted.

Figures 4, 4A:
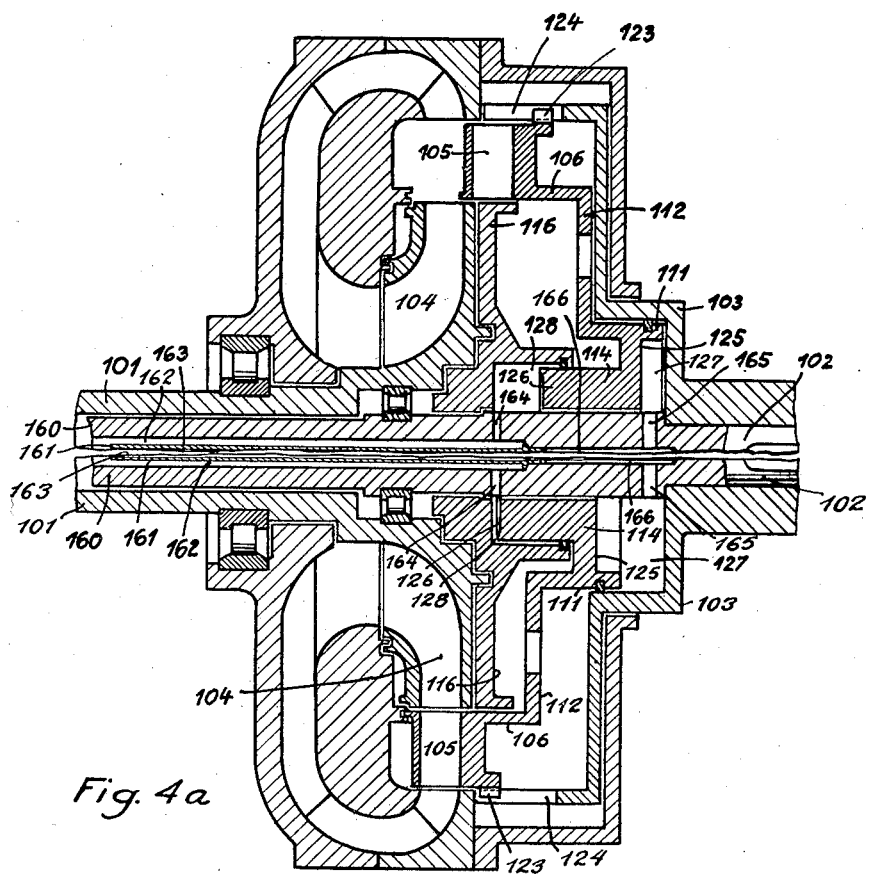

In the example shown in Figs. 4 and 4—a, the turbine wheel 105 joins a ring 106 which is connected by means of the disc 112 to a stepped piston 111. The latter can be shifted in the cylinder 103 which is connected to the secondary shaft 102 in a way that it cannot be turned or shifted. 101 is the primary shaft, 104 the pump wheel. Hub part 114 of the stepped piston 111 can be shifted in the hub bore 128 arranged at the intermediate piece 116. Rotor 105 is equipped at its external periphery with keys 123 which can be shifted in the corresponding keyways 124 of the guide part 103. 125 and 126 indicate the operating surfaces of the stepped piston 111; 127 and 128 are the pressure means spaces of the cylinder 103. In the bore of the shaft 101 is situated a portion of shaft 160 forming an extension of shaft 102 to the left and carried in a roller bearing of shaft 101. In the bore of the portion of shaft 160 is situated the tube 161 the extension of which on the right hand forms a bore 166 in the shaft 102 from which radiate radial bores 165. The space 162 between the portion of shaft 160 and the tube 161 corresponds to the space 62 in Fig. 2, and the bore 163 of the tube 161 corresponds to the bore 63 of Fig. 2. From the circular space 162 radiate bores 164, leading into the middle of the cylinder 103.

In the example of Fig. 4, there is constantly a supply of oil through the bores 163, 166 and 165 without or with a slight overpressure into the space 127. The displacement of the turbine wheel 105 outwards is performed by means of supplying pressure oil through the space 162 and the bores 164 into the space 128 in front of the surface 126 of the step piston 111. When the oil supply under pressure is interrupted the turbine wheel is engaged by the fact that the surface 125 of the step piston 111 in the space 127 is constantly pressure-operated due to the centrifugal force of the liquid in this space. The dimensions of surface 125 of the step piston 111 ensure that turbine wheel 105 is kept in its engaged position in the circuit at every speed of rotation.

Figs. 5 and 6 show 201 the primary shaft, 202 the secondary shaft of the converter. 203 is a roller bearing carrying both shafts. 204 is a pump wheel, 205 the turbine wheel, 206 the guide apparatus of the converter. 208 is a bend pipe joining the guide apparatus and adjacent to the casing part 209 in the hub 210 of which is carried a driver 211 arranged on the shaft 202 in a way that it cannot be turned or shifted. 213 is the disc connecting the rim of the turbine wheel 205 with the hub 214. The driver 211 and the cylinder 224 connected to the disc 213 are coupled by means of dogs or teeth 215, 216 for rotation, however, in a way that the turbine wheel 205 can be shifted in the direction of the axis. The disc 213 is provided with apertures 217. 218 is the interval between the casing wall 209 and the disc 213.

In the bore of the shaft 201 is located an extension 220 of the shaft 202 in the centre of which is situated a tube 221. The circular space 222 between the tube 221 and the portion of shaft 220 as well as the space 223 within the tube 221 ensure the supply of pressure fluid to the cylinder 224. In the shaft portion 226 there are arranged the bores 225 and 226 which are connected to the spaces 222 and 223 and lead into the centre of the cylinder 224—the bores 225 on the left hand, the bores 226 to the right hand of the solid piston 231 which is connected to the shaft portion 226. Fixed to the shaft 220 is a disc-shaped intermediate piece 227 at the external rim of which is provided a joint surface 228. An identical joint surface 229 is arranged on the outside of the disc 213 of the turbine wheel 205.

The displacement of the turbine wheel 205 is effected by supplying pressure fluid, for instance oil pressure, via the spaces 222 and 223 to the cylinder 224. When the turbine wheel 205 is in the engaged position as shown in Fig. 6, the cylinder 224 and consequently the turbine wheel 205 can be shifted to the right by supplying pressure oil through the space 223 and the bores 226 to the space on the right hand of the piston 231 so that the turbine wheel 205 is shifted into the position as shown in Fig. 5 in which it is withdrawn from the hydraulic circuit of the converter. The circuit itself continues to be maintained. By supplying pressure oil through the circular space 222 and the bores 225 into the space on the left hand of the piston 231, the turbine wheel 205 can be shifted back into the circuit from the disengaged position. 233 is the interval at the external periphery of the turbine wheel 205, 234 the inlet cross section of this wheel, 235 are ducts or gaps.

When disengaged from the circuit, the turbine wheel 205 approaches the wall 209 so close that there is only the interval 218 between the disc 213 and the wall 209. By means of the liquid existing in the interval 218 the number of revolutions of the turbine wheel 205 is quickly reduced due to friction and turbulence. The same process takes place when, as shown in Fig. 6, the blades 219 are provided preventing the liquid in the interval 218 from circulating with the disc 213 thus exercising also a braking action on the disc 213. The blades 219 may extend in the radial and the peripheral direction over so large a surface and into the wall 209 as is necessary to attain the desired braking effect.

By means of the apertures 217 provided in the disc 213 the liquid escaping at the external periphery of the turbine wheel 205 via the interval 233 to the right flows again via the interval 218 back to the left and thus in front of the inlet cross section 234 of the turbine wheel. By the arrangement of the apertures 217 a constant circulation of the liquid is ensured by means of the turbine wheel 205.

This pumping effect may be considerably increased if in the wall of the casing 209 ducts or gaps 235 are provided by means of which, the turbine wheel 205 being disengaged, the amount of entering liquid between the blade spaces of the turbine wheel 205 and the interval 218 is increased.

The construction, according to our invention, is particularly important with change speed gears arranged behind the hydraulic torque converter in order to brake the turbine wheel-connected clutch half in the change speed gear down to the engaging speed. But it is equally of importance in case of purely hydraulic transmissions (without a combination with a mechanical change speed gear).

In the construction shown in Fig. 7 the disc 213' and the casing wall 209' are equipped with braking surfaces 241 and 242 respectively. When disengaged the turbine wheel is in the illustrated position so that the braking surfaces 241 and 242 are pressed close together thus effecting a braking of the turbine wheel and of the rotating parts connected to shaft 202, respectively.

Our invention eliminates not only the difficult and tedious emptying of the operating liquid of the hydraulic torque converter but combines, furthermore, as shown by the examples, all the advantages of such a converter with those of a friction clutch without the difficulties arising in such a combination normally under service conditions.

With hydraulic torque converters, according to our invention, when used in combination with change speed toothed gearings as usually applied to motor cars, the shiftable turbine wheel design permits eliminating a special friction clutch otherwise necessary for the operation of the change speed toothed gearing.

We do not want to be limited to the details described or represented in the drawings, as many variations will occur to those skilled in the art without deviating from the scope of our invention as defined by the appended claims.

What we claim is:

1. A hydraulic torque converter comprising a pump wheel, a turbine wheel, a guide wheel, means for shifting the turbine wheel out of the hydraulic circuit, a casing around said converter and blades inside on the wall of said casing near the position of the disengaged turbine wheel and adapted to brake the speed of the fluid rotating with said turbine wheel.

2. In a hydraulic torque converter, the combination of a hollow driving shaft; a pump wheel fixed on one end of said shaft; a driven shaft having one portion disposed in said driving shaft; and another portion projecting therefrom and journaled in said wheel, and another portion projecting therefrom; a turbine wheel slidable on said last mentioned projecting portion of the driven shaft, and shiftable into and out of the hydraulic circuit; fluid pressure operating means for shifting said turbine wheel, disposed on said last mentioned projecting portion of the driven shaft; and channels for feeding fluid under pressure to said operating means, said channels passing through the portion of the driven shaft disposed in the driving shaft and the portion journaled in the pump wheel, and into the portion of the driven shaft projecting from the pump wheel.

3. In a hydraulic torque converter, the combination of a pump wheel; a turbine wheel shiftable into and out of the hydraulic circuit; means for shifting said turbine wheel; a casing around the converter, so disposed as to provide a shifting space for said turbine wheel; and means disposed in said shifting space for reducing the speed of flow of the fluid rotating with the turbine wheel when said turbine wheel is shifted out of the hydraulic circuit, thereby braking said turbine wheel.

RICHARD LANG.
JÜRGEN von FAHLAND.
HERMANN GROS.